3,684,469
METHOD OF COATING GLASSWARE
William C. Goelzer, Millville, and Patrick A. Moratelli, Jr., Vineland, N.J., Albert M. Griffith III, Mount Joy, Pa., David D. Myers, Albany, Ind., Herman E. Opitz, Lancaster, Pa., and John J. Procopio, Millville, N.J., assignors to Kerr Glass Manufacturing Corporation, Los Angeles, Calif.
Filed Sept. 23, 1970, Ser. No. 74,822
Int. Cl. B44d 1/08, 1/02
U.S. Cl. 65—60
3 Claims

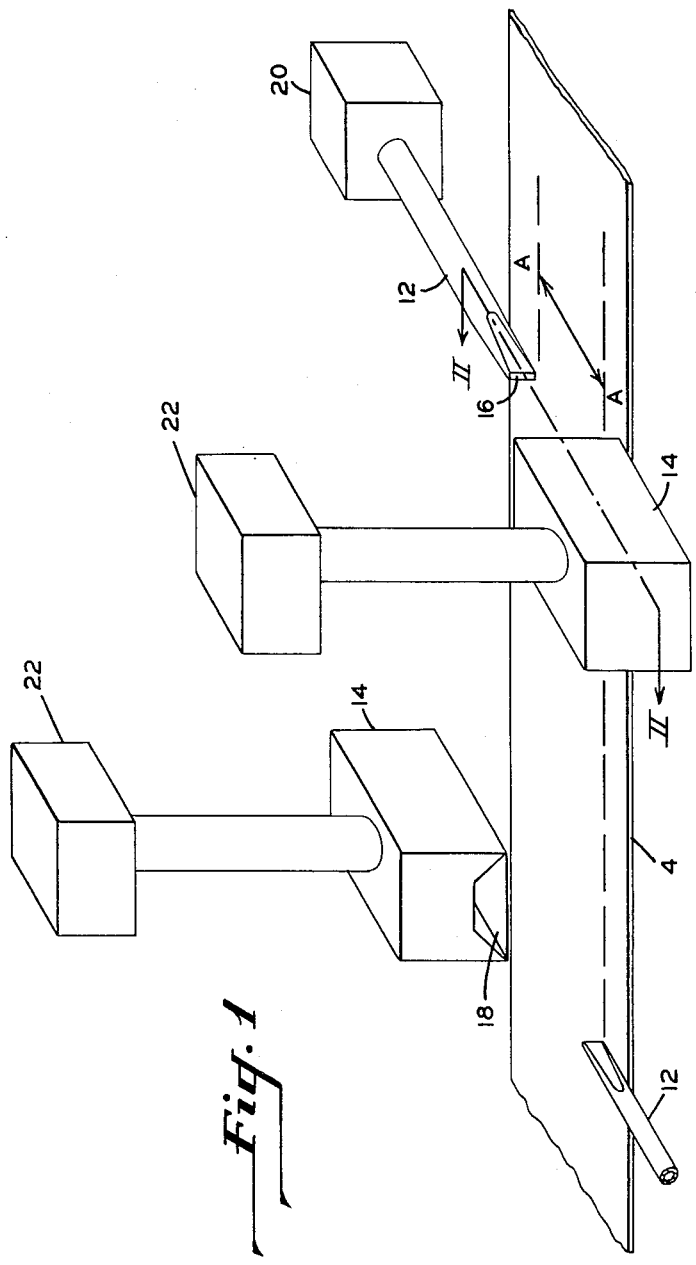
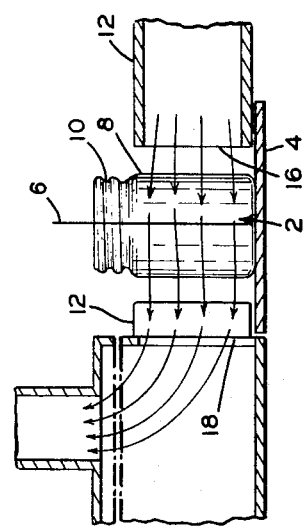
INVENTOR
WILLIAM C. GOELZER
PATRICK A. MORATELLI, JR.
ALBERT M. GRIFFITH, III
DAVID D. MYERS
HERMAN E. OPITZ
JOHN J. PROCOPIO
BY Clifford B. Price
ATTORNEY United States Patent Office 3,684,469
Patented Aug. 15, 1972

ABSTRACT OF THE DISCLOSURE

Scratch resistance of glassware is increased by coating the glass surface with tetraalkyl titanate. This coating should be placed only on the barrel of the glassware and not the finish of the glassware. Controlled coating is accomplished by passing the glassware between closely spaced coacting rectangular dispensing nozzles and exhaust ports which cooperate together to distribute the coating across the barrel of the glassware without coating the finish of the glassware.

BACKGROUND OF THE INVENTION

Field of the invention

The disclosure of this application is identical with the disclosure of application Ser. No. 811,985 filed Apr. 1, 1969, now abandoned.

The invention relates to an apparatus for providing a coating which improves the scratch resistance and thus the practical effective strength of glass articles, particularly glass containers, by decreasing the chance of surface damage. It more particularly relates to the controlled placement of tetraalkyl titanate as the scratch-resistant coating on the barrel of glass containers.

Description of the prior art

The use of metallo-organic esters, such as alkyl titanates for improving the scratch resistance of glass surfaces by pyrolyzing the esters to form a coating of titanium dioxide on the glass surface, is well known in the art. Several methods of accomplishing this have been disclosed in U.S. patents, probably the basic patent in this area being U.S. Pat. No. 2,831,780 to Alden J. Deyrup, which discloses a method for improving the scratch resistance of glass bodies in which the heated surface of glass articles is treated with a vaporized titanate which is fed in a stream of inert gas into a heated annealing furnace. There are also available in the art hooded structures such as the "North-western" apparatus, which dispenses a stannic tetrachloride vapor through a grill on one side of a conveyer line and provides an exhaust opening on the opposite side of the conveyer.

The disadvantage of the above structures and most structures presently used in the art is that they cannot handle titanate to provide for a controlled and uniform placement of the titanate coating on glassware. The coating will coat not only the barrel of the glassware but also the finish of the glassware over which the closure is placed. The material used in some closures tends to react with the titanate coating to bond the closure to the glassware and thus prevent easy removal of the closure from the finish of the glassware. Such a feature has been particularly troublesome in the area of baby food jars, wherein the user has been finding it exceedingly difficult to turn the closures off the finish of the baby food jars. Other structures in the art have the disadvantage of incurring jam-ups, which the below-described structure eliminates.

SUMMARY OF THE INVENTION

Controlled coating of glassware is accomplished by passing the glassware on a conveyer belt past the coating apparatus. The coating apparatus has at least two stations, and on each station there is a dispensing nozzle on one side of the conveyer and an exhaust duct on the opposite side of the conveyer. In each set of two stations, the dispensing nozzles are positioned on opposite sides of the conveyer belt with the adjacent exhaust ducts also being on opposite sides of the conveyer belt. Each coacting dispensing nozzle and exhaust duct is closely spaced together with adjacent nozzles so positioned that there is just about enough room therebetween for the glassware to pass therebetween in a single row. The dispensing nozzle is generally rectangular in shape with its long axis being parallel to the long axis of the glassware and its largest dimension being equal to or less than the height of the barrel of the glassware. The exhaust duct is placed opposite the dispensing nozzle. The titanate is dispensed as a fog from the dispensing nozzles; and fogged titanate, which does not coat the barrel of the glassware, is withdrawn by the exhaust duct.

BRIEF DESCRIPTION OF THE DRAWING

FIG. 1 is a perspective view of the coating apparatus; and
FIG. 2 is a cross-sectional view of the glassware between the noozle and duct.

DESCRIPTION OF THE PREFERRED EMBODIMENT

The titanate material is normally in a liquid state. A microfog lubricator of the type disclosed in Pat. 2,966,312 is used to convert the liquid into a fog or aerosol, in which the titanate material exists as very small and uniform particles of material about two microns in size. These particles are then borne by an air stream to a dispensing nozzle structure. The use of a fog with dry air makes possible the use of titanate as a coating material since the fogging overcomes the hygroscopic nature of titanate. Titanate used as a vapor in conventional coaters is greatly influenced by humidity which is a condition that cannot be eliminated in a glass plant. Titanate is a superior coating compared to other coatings used in the art since it does not cause cap corrosion. The use of the fog has the additional advantage in that it permits recirculation of the unused titanate for cost savings. Naturally other coating materials could be used as the fog. Even some coating materials in vapor form could be used in the above-described apparatus.

The glassware is conveyed from the glassware forming machine by a conveyer, and this ware is at a temperature about 900° F. In the glass manufacturing art, the applying of a coating to the hot glassware on the above conveyer would be known as the hot-end coating of glassware. As best seen in FIG. 2, the glassware 2 to be coated is being carried on a conveyer 4 with its longitudinal axis 6 perpendicular to the conveyer. The lower portion of the glasware 8 is referred to as the barrel of the glassware, while the upper portion 10 to which the closure is to be fastened is referred to as the finish of the glassware. The hot glassware 2 is carried down the conveyer 4 past the coating stations as seen in FIG. 1. There are actually two coating stations, each station being composed of a nozzle assembly 12 and an exhaust assembly 14. It will be seen that the nozzles and exhaust assemblies are positioned on opposite sides of the conveyer with the opposite nozzle and duct facing each other and adjacent nozzles and ducts being on opposite sides of the conveyer line.

As best seen in FIG. 1, right side, the nozzle assembly 12 has an exit port 16 which is preferably rectangular in cross section and has its long axis perpendicular to the conveyer belt and parallel with the axis 6 of the glassware. The height or longest dimension of the rectangular opening is equal to or slightly less than the overall height of the barrel of the glassware to be coated. The exhaust assembly 14, as best seen on the left side of the FIG. 1, has an exhaust opening 18 which is used to draw in the excess titanate fog. The nozzle assembly 12 dispenses the fogged titanate, which is supplied by a conventional fogging apparatus 20. Enlarged delivery ducts supply the fogged titanate to the nozzle assembly from the fogging apparatus. The exhaust is accomplished by a conventional exhaust structure 22 fastened to the exhaust duct assembly 14. As will best be seen in FIG. 2, the fog is dispensed from the exhaust nozzle and passes across only the barrel of the glassware, and excess titanate fog is drawn off through the exhaust opening 18 of the exhaust assembly 14. It has been found that the best control and most efficient material usage for the selective coating of the barrel only of the glassware is secured by positioning the dispensing nozzles very close to the barrel of the glassware to be coated. Referring to FIG. 1, it should be noted that the adjacent nozzles are very close to the glassware while the exhaust opening is placed at the edge of the belt 2. Placement of the nozzles is more critical than placement of the exhaust openings. The lateral distance between nozzles, that is, the distance A—A across the conveyer, is slightly more than the diameter of the glassware to be coated.

Also an advantage of this nozzle-duct arrangement is that it provides an open-side coating structure. That is, the conventional hood structure with side walls parallel to the sides of the conveyer has been eliminated. Now with the above nozzle and duct arrangement, tipped over bottles will be free to fall off the conveyer and not jam up between side wall structures, which to date exist in other conventional coating apparatus. Coated hot bottles tend to stick together and form large masses which jam up between the side walls of the conventional coaters.

To date, best results have been accomplished for the hot-end coating of the barrel of a 5 oz. baby food jar with the minimum coating on the finish area by the use of a rectangular nozzle with a ¾ square inch open area, and the nozzle being placed about ⅜″ from the side of the glassware. The nozzle discharges the aerosol with about 7 to 9 c.f.m. dry air stream. This particular configuration for the above coating apparatus provides for the selective coating of only the barrel portion of the glassware and provides for a uniform coating on the overall circumference of the glassware.

We claim:

1. A method of hot-end coating predetermined areas of glassware with a minimal coating on other areas of the glassware, said method comprising the steps, moving the glassware having a predetermined maximum width for said predetermined area along a predetermined path of travel through first and second coating stations while said other areas are exposed to ambient conditions, generating droplets of hygroscopic coating material and carrying the same in a dry gas in aerosol form, dispensing said droplets from a first nozzle location in a controlled first stream having a predetermined height and at a position closely adjacent said glassware along a first side of said path of travel, drawing excess droplets from said first stream about the facing side of the predetermined area of said glassware and in a substantially straight flow path about said glassware and laterally cross to the other side of said path of travel and to a position directly opposite said first dispensing position for exhausting the excess droplets of said first stream, moving said glassware from said first stream and said first station downstream to the second station, dispensing said droplets from a second nozzle location in a controlled second stream which is spaced from said first stream and discrete from said first stream, said second stream having a predetermined height, said second nozzle location being at a position closely adjacent a side of the glassware opposite said first side and along the other side of said path of travel, said nozzle locations being spaced apart in a direction normal to the path of travel by a distance only slightly greater than said width of said glassware, drawing excess droplets from said second stream laterally across to the first side of said path of travel in a substantially straight flow path about said glassware and laterally to a position directly opposite said second dispensing position, each of said first and second streams coating upstream and downstream facing sides of said glassware, and moving said glassware from said second station with a substantial coating on said predetermined area and a minimal coating on the other sides of glassware.

2. A method in accordance with claim 1 in which the glassware has a barrel portion and a finish and further including the step of limiting the height of the coating stream to the barrel portion and thereby minimizing the coating on the finish.

3. A method of hot-end coating predetermined areas of hot items of glassware, said method comprising the steps, moving said hot items of glassware along a path of travel past first and second coating stations while on a generally horizontal open-sided conveying means in which said items of glassware are exposed to ambient conditions and are spaced in a single file relationship, said hot items of glassware being free to move laterally from said conveying means and said path to prevent jam-ups of hot coated items on said conveying means, generating droplets of a hygroscopic coating material and transporting the same in a dry gas carrier in aerosol form, dispensing said droplets generated by said generating means in a first stream at a position closely adjacent said hot items and along a first side of said path, drawing excess droplets laterally across said conveying means to a position located directly across from said dispensing position and exhausting the excess droplets, limiting the height of said stream of coating material to approximately the height of said predetermined area on said glassware, moving said hot items on said open conveying means downstream from said first coating station to a second coating station, dispensing said droplets generated by said generating means in a second stream at a position closely adjacent said hot items and along the other side of said path of travel for coating a second side of said predetermined area on said glassware, drawing excess droplets from said second stream laterally across said conveying means to a position located directly across from said dispensing position and exhausting the excess droplets, limiting the height of said stream of coating material to approximately the height of said predetermined area on said items, whereby controlled substantially uniform coating of glassware is secured only on the predetermined area of the glassware with minimizing of the coating on the other areas of the glassware.

References Cited

UNITED STATES PATENTS

| | | | |
|---|---|---|---|
| 2,847,324 | 8/1958 | Ogint | 117—105.3 X |
| 3,172,780 | 3/1965 | Czok et al. | 118—314 X |
| 3,253,943 | 5/1966 | Mayer et al. | 117—94 |
| 3,379,559 | 4/1968 | Gerhardt | 117—94 X |
| 3,438,803 | 4/1969 | Dubble et al. | 117—124 A X |

EDWARD G. WHITBY, Primary Examiner

U.S. Cl. X.R.

117—94, 105.3, 107.1, 107.2, 124 T, 160 R; 118—314